(12) United States Patent
Lee et al.

(10) Patent No.: US 7,032,434 B2
(45) Date of Patent: Apr. 25, 2006

(54) WATER LEAKAGE DETECTING DEVICE IN DISHWASHER

(75) Inventors: Yong Jae Lee, Ulsan-si (KR); Jae hyuk Lee, Busan (KR); In Haeng Cho, Changwon-si (KR); Joung Hun Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/882,150

(22) Filed: Jul. 1, 2004

(65) Prior Publication Data

US 2005/0028844 A1 Feb. 10, 2005

(30) Foreign Application Priority Data

| Jul. 4, 2003 | (KR) | ................. 10-2003-0045314 |
| Jul. 25, 2003 | (KR) | ................. 10-2003-0051347 |
| Jul. 25, 2003 | (KR) | ................. 10-2003-0051348 |
| Jul. 25, 2003 | (KR) | ................. 10-2003-0051349 |

(51) Int. Cl.
*G01M 3/04* (2006.01)

(52) U.S. Cl. ............................................. 73/40
(58) Field of Classification Search ............. 73/40, 73/49.2, 290 R, 305, 307; 340/612, 618, 340/623, 624, 625; 702/51, 55, 58; 137/312
See application file for complete search history.

(56) References Cited

U.S. PATENT DOCUMENTS

| 3,770,002 A | * | 11/1973 | Brown ..................... 137/312 |
| 4,020,488 A | * | 4/1977 | Martin et al. ............ 340/508 |
| 4,805,662 A | * | 2/1989 | Moody ..................... 137/312 |
| 5,006,834 A | * | 4/1991 | Fountain ................... 340/625 |
| 5,156,042 A | * | 10/1992 | Carlin et al. .............. 73/49.2 |
| 5,247,833 A | * | 9/1993 | Sasaya ...................... 73/301 |
| 5,345,224 A | * | 9/1994 | Brown ..................... 340/605 |
| 5,632,302 A | * | 5/1997 | Lenoir, Jr. ................ 137/312 |
| 5,703,569 A | * | 12/1997 | Oliver et al. ............. 340/605 |
| 5,744,701 A | * | 4/1998 | Peterson et al. ........... 73/49.2 |
| 5,839,655 A | * | 11/1998 | Iritani ...................... 237/8 A |
| 6,154,144 A | * | 11/2000 | Johnson ................... 340/620 |
| 6,414,598 B1 | * | 7/2002 | Freill et al. .............. 340/623 |
| 2003/0227387 A1 | * | 12/2003 | Kimberlain et al. ........ 340/618 |
| 2004/0007264 A1 | * | 1/2004 | Bootka ..................... 137/312 |

* cited by examiner

*Primary Examiner*—Hezron Williams
*Assistant Examiner*—Rodney Frank
(74) *Attorney, Agent, or Firm*—McKenna Long & Aldridge LLP

(57) ABSTRACT

A water leakage detecting device for effectively detecting water leakage and sensing malfunctions in the device is disclosed. The device includes a base retaining water leaked from a tub, a detector detecting whether leaked water is retained in the base, a first signal generator outputting a signal, when the detector detects the leaked water, a second signal generator outputting a signal, when the detector does not detect the leaked water, and a controller deciding whether to drain the leaked water and determining whether the water leakage detecting device has a malfunction.

17 Claims, 11 Drawing Sheets

WATER LEAKAGE DETECTING DEVICE IN DISHWASHER

CROSS-REFERENCE TO RELATED APPLICATIONS

This application claims the benefit of Korean Application Nos. P2003-045314, filed on Jul. 4, 2003, P2003-051347, filed on Jul. 25, 2003, P2003-051348, filed on July 25, 2003, and P2003-051349, filed on Jul. 25, 2003, which are hereby incorporated by reference as is fully set forth herein.

BACKGROUND OF THE INVENTION

1. Field of the Invention

The present invention relates to a detecting device, and more particularly, to a water leakage detecting device in a dishwasher. Although the present invention is suitable for a wide scope of applications, it is particularly suitable for effectively detecting water leakage and sensing malfunctions in the device.

2. Discussion of the Related Art

Generally, a dishwasher is an appliance removing residues remaining on used dishes and thoroughly washing the dishes. The dishwasher includes a tub for retaining washing water supplied from a faucet, and a washing water jet spraying the water in the tub to the dishes to be washed. A washing motor supplies the water retained in the tub to the washing water jet, and the water sprayed from the washing water jet is retained back in the tub. Also, the dishwasher further includes a base for retaining water leaked from the tub, and a drainage pump for draining out the water from the base.

As described above, since the dishwasher uses water, and the dishwasher may have problems of water leakage. Although the drainage pump drains out the water leaked from the tub, if the water leaked from the tub is not accurately detected, the leaked water retained in the base cannot be drained out of the dishwasher at the appropriate time.

SUMMARY OF THE INVENTION

Accordingly, the present invention is directed to a water leakage detecting device that substantially obviates one or more problems due to limitations and disadvantages of the related art.

An object of the present invention is to provide a water leakage detecting device that can effectively detect water leakage and other malfunctions within the dishwasher.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a water leakage detecting device includes a base retaining water leaked from a tub, a detector detecting whether leaked water is retained in the base, a first signal generator outputting a signal, when the detector detects the leaked water, a second signal generator outputting a signal, when the detector does not detect the leaked water, and a controller deciding whether to drain the leaked water and determining whether the water leakage detecting device has a malfunction.

Herein, the detector either includes a floating unit changing its height in accordance with a level of the leaked water in the base, and a switch selectively supplied a voltage to the first signal generator and the second signal generator depending upon the height of the floating unit, or includes a pair of conductors spaced apart from each other and allowing electrical current to flow therebetween through the leaked water, and an electric current sensor sensing the electric current flowing between the pair of conductors.

The controller determines the water leakage detecting device to have a malfunction, when the controller either receives both signals from the first and second signal generators or none of the signals from the first and second signal generators. And, the leaked water is drained outside of the base, when the controller only receives a signal outputted from the first signal generator. Also, the controller resumes a washing cycle currently in process, when the controller only receives a signal outputted from the second signal generator.

The controller compares voltage levels of the signals received from the first and second signal generators through a single wire with reference voltage levels. Herein, the controller determines the water leakage detecting device to have a malfunction, when none of the voltage levels of the received signals is equal to the reference voltage levels. And, the controller decides whether to drain the leaked water from the base, when any one of the voltage levels of the received signals is equal to the reference voltage level.

In another aspect of the present invention, a method for detecting water leakage includes detecting leaked water in a base, outputting a first signal, when the leaked water is detected, and outputting a second signal, when the leaked water is not detected, and deciding whether to drain the leaked water and determining whether the water leakage detecting device has a malfunction, depending upon the first signal and the second signal.

When determining whether the water leakage detecting device has a malfunction, the water leakage detecting device is determined to have a malfunction, when both the first signal and the second signal are outputted and when none of the first signal and the second signal is outputted.

Also, when deciding whether to drain the leaked water, the leaked water is decided to be drained, when only the first signal is outputted, whereas the leaked water is decided not to be drained and a washing cycle currently in process is resumed, when only the second signal is outputted.

The deciding whether to drain the leaked water and determining whether the water leakage detecting device has a malfunction comprises comparing voltage levels of the signals outputted from a single wire with a reference voltage level, when the first signal and the second signal are outputted through a single wire. Herein, the water leakage detecting device is determined to have a malfunction, when the levels of the signals outputted from the single wire are not equal to the reference voltage level, and the leaked water is decided to be drained depending upon the voltage level of the signals, when the level of any one of the signals outputted from the wire is equal to the reference voltage level.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

Figure 1A:
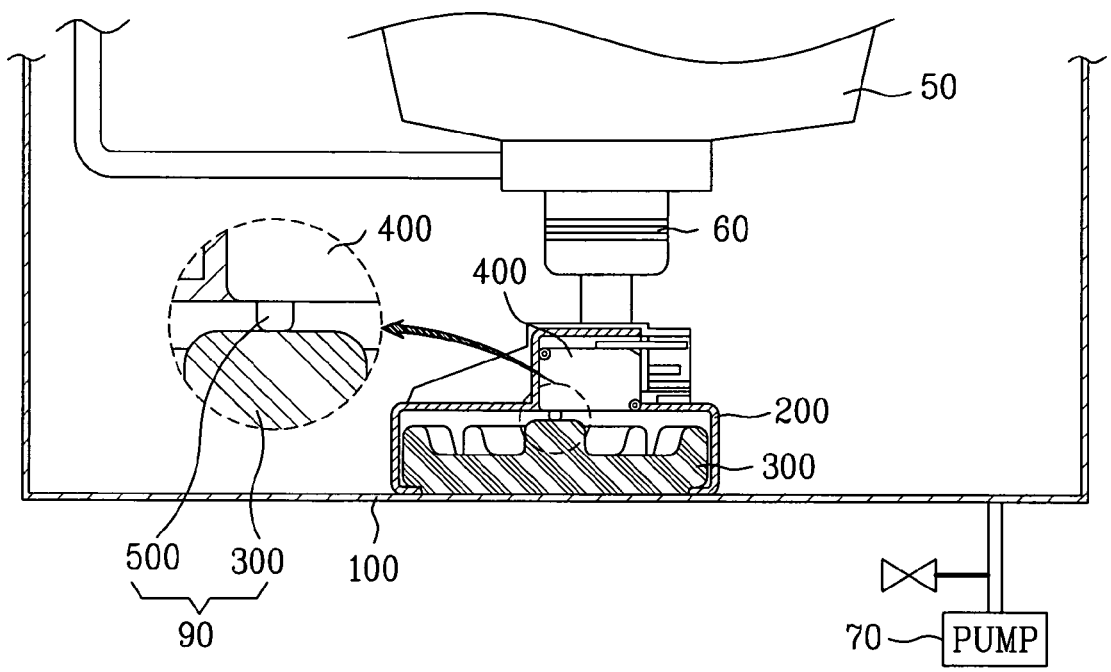
FIGS. 1A and 1B illustrate a dishwasher according to the present invention.
Figure 1B:
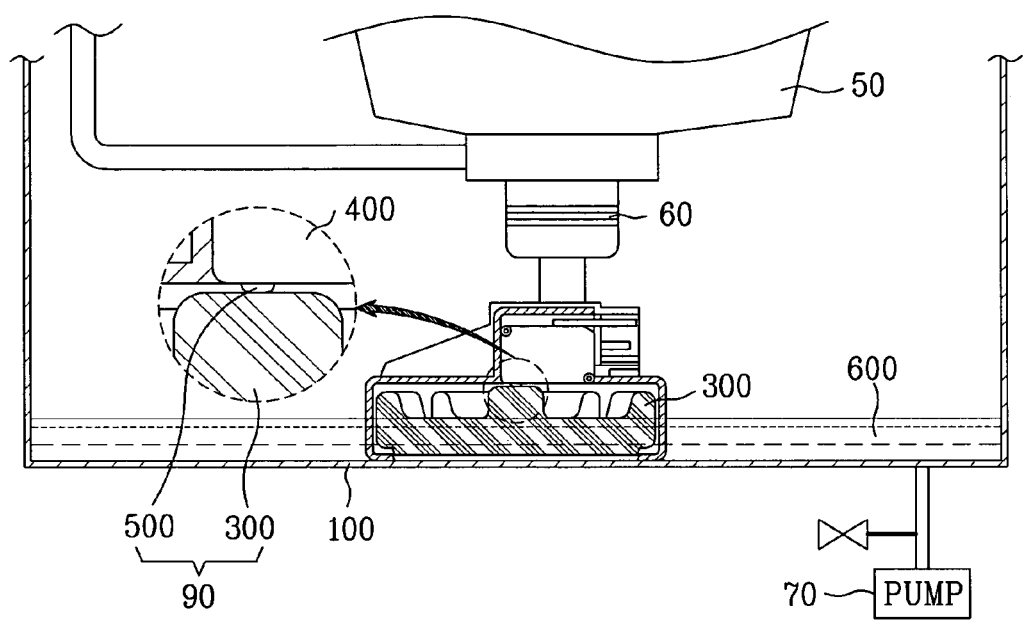

FIGS. 1A and 1B illustrate a dishwasher according to the present invention. At the outside of a tub 50 accommodating used dishes, a base 100 for retaining water leaked from the tub 50 is provided. A water leakage detecting device for detecting water leakage is formed inside the base 100. Herein, the water leakage detecting device includes a detector 90 for detecting water that has leaked into the base 100, a signal generating part 400 generating a signal depending upon the detection result of the detector 90, and a controller 20 determining drainage of the leaked water based on the signal outputted from the signal generating part 400 and determining whether there is a problem in the water leakage detecting device.

The detector 90 includes a floating unit (e.g., an expanded polystyrene) 300 having a height varying based on the water level within the base 100, a switch 500 selectively connecting terminals 11 and 51 to a power supply 15 in accordance with the height of the floating unit 300, and a guide 200 provided on the circumference of the floating unit 300 for guiding the floating unit 300.

Figure 2:
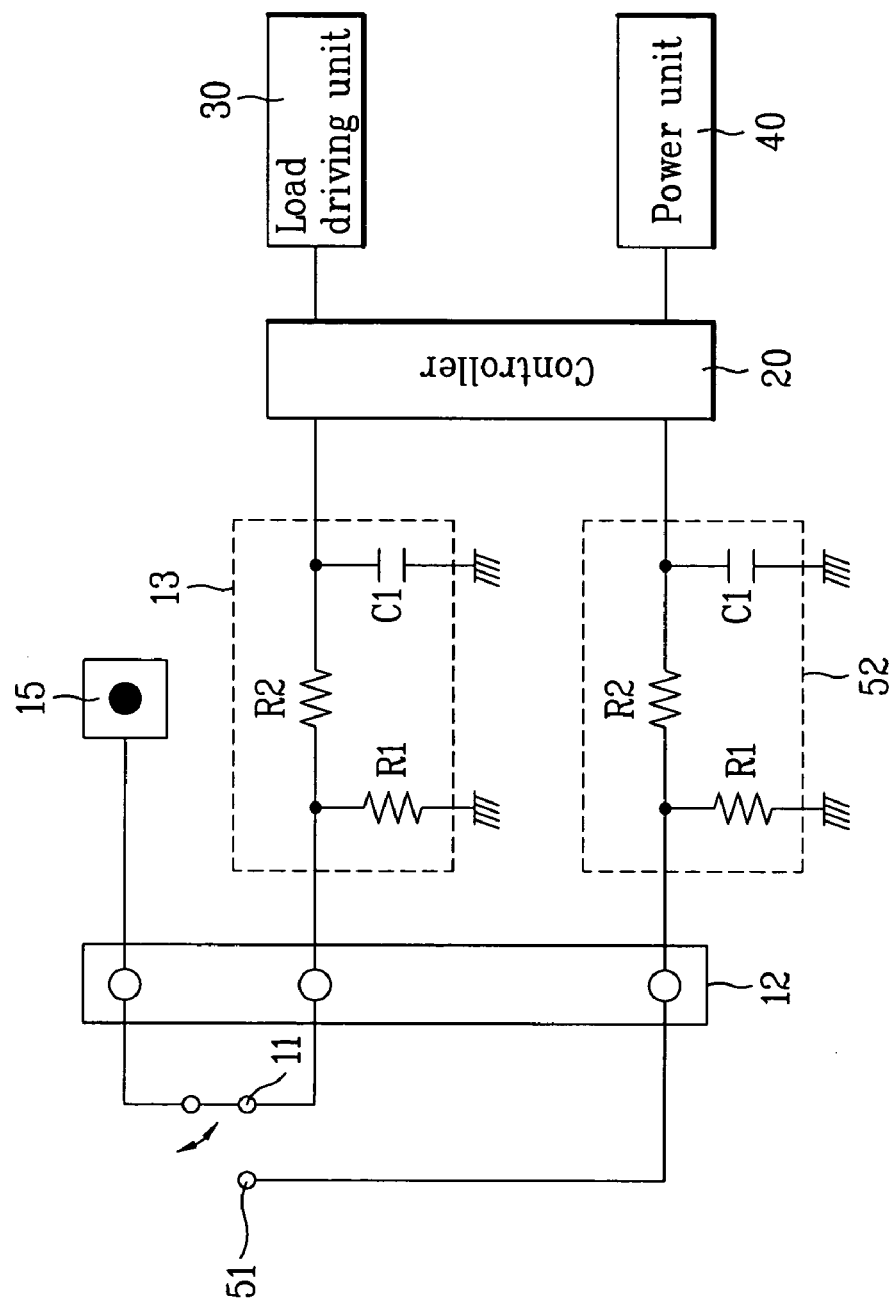
FIG. 2 illustrates a water leakage detecting device according to a first embodiment of the present invention.

Referring to FIG. 2, the signal generating part 400 includes a first signal generator 13 outputting a high level signal when the detector 90 detects leaked water in the base 100, a second signal generator 52 outputting a high level signal when the detector 90 does not detect any leaked water in the base 100, and a connector 12 for selectively connecting the first and second signal generators 13 and 52 to the power supply 15. The first and second signal generators 13 and 52 convert the voltage supplied from the power supply 15 to a stable signal having less noise. The signal generators 13 and 52 are formed to have a same resistance and condenser in order to output signals of an identical level. When each of the first and second signal generators 13 and 52 simultaneously outputs a high level signal or a low level signal, the controller 20 determines that the water leakage detecting device is damaged or has a malfunction. Then, the controller 20 displays a message to inform the user of the problem or malfunction.

Figure 3:
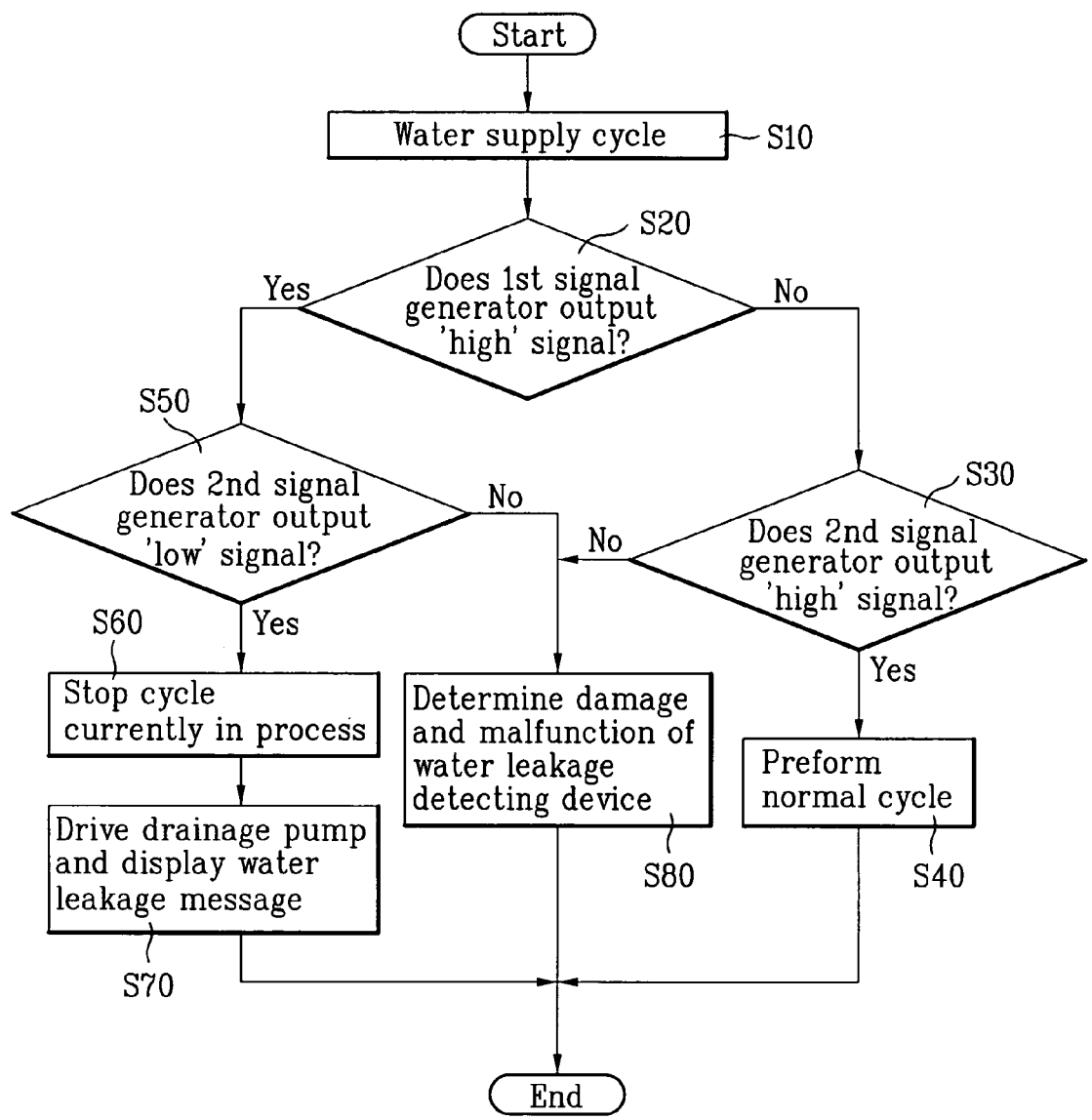
FIG. 3 illustrates a flow chart showing the process steps of a water leakage detecting method.

The method for detecting water leakage will now be described in detail. FIG. 3 illustrates a flow chart showing the process steps of a water leakage detecting method according to a first embodiment of the present invention.

Referring to FIG. 3, when the dishwasher is turned on and the user command is inputted, the controller 20 supplies the washing water into the tub in order to wash the dishes (S10). In order to determine whether there is leaked water retained in the base 100, the controller 20 verifies whether the first signal generator 13 outputs a high level signal (S20). If there is no leaked water retained in the base 100, or if the leaked water retained in the base 100 does not reach the predetermined level, the switch 500 does not connect the power supply 15 to the terminal 11 of the first signal generator 13, but only connects the power supply 15 to the terminal 51 of the second signal generator 52. Therefore, the first signal generator 13 outputs a low level signal to the controller 20, and the second signal generator 52 outputs a high level signal to the controller 20. Accordingly, the controller 20 simultaneously determines that there is no leaked water retained in the base 100 and that there is no damage or malfunction in the water leakage detecting device.

Conversely, if the leaked water reaches the predetermined level in the base 100, the position of the floating unit 300 of the detector 90 is elevated accordingly, and the switch 500 connects the terminal 11 of the first signal generator 13 to the power supply 15. Therefore, the first signal generator 13 outputs a high level signal to the controller 20, and the second signal generator 52 outputs a low level signal to the controller 20. Accordingly, the controller 20 simultaneously determines that there is leaked water retained in the base 100 and that there is no damage or malfunction in the water leakage detecting device.

As described above, when the water leakage detecting device is operated normally, the signal outputted from the first signal generator 13 and the signal outputted from the second signal generator 52 are different from one another. However, due to a malfunction or damage in the water leakage detecting device, the first signal generator 13 and the second generator 52 could output the signals of the same level. For example, when a malfunction occurs in the connector 12 or the power supply 15, both of the first and second signal generators 13 and 52 output low level signals.

In order to identify any partial damage or a malfunction in the water leakage detecting device, the controller 20 verifies whether the signals outputted from the first and second signal generators 13 and 52 have different levels (S30 and S50). If the signals outputted from each of the first signal generator 13 and the second signal generator 52 have the same level, the controller 20 determines that the water leakage detecting device is damaged or has a malfunction, thereby displaying an "ERROR" message (S80). Conversely, if the signals outputted from each of the first signal generator 13 and the second signal generator 52 have different levels, the controller 20 proceeds the washing cycle in accordance with the level of the outputted signals. For example, when the first signal generator 13 outputs a high signal level and the second signal generator 52 outputs a low signal level, the controller 20 stops the washing cycle currently in process (S60). Then, the controller 20 displays a message indicating water leakage and simultaneously operates the drainage pump 70 so as to drain out the leaked water from the base 100 (S70). On the other hand, when the first signal generator 13 outputs a low signal level and the second signal generator 52 outputs a high signal level, the controller 20 carries on with the washing cycle currently in process (S40).

Second Embodiment

Figure 4:
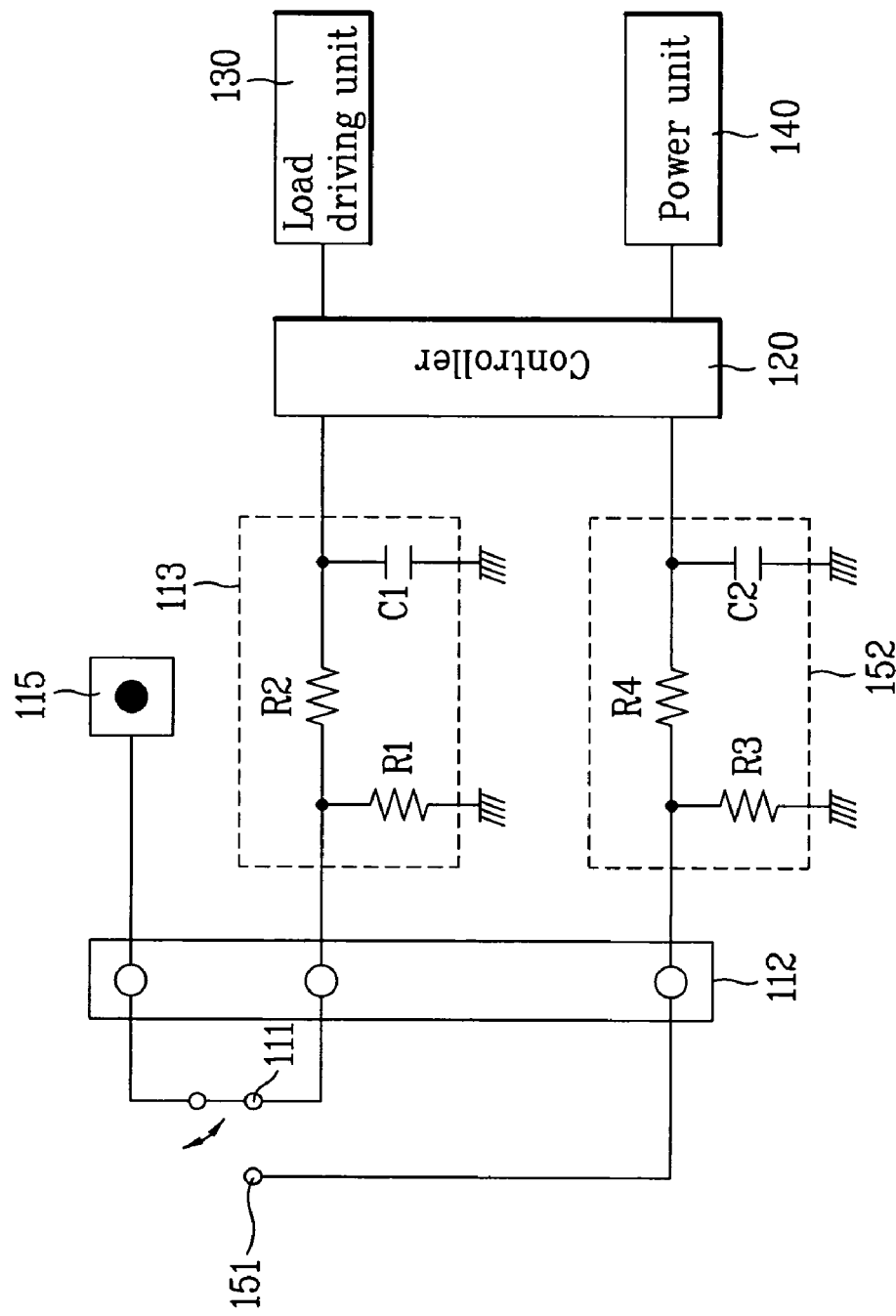
FIG. 4 illustrates the water leakage detecting device according to a second embodiment of the present invention.

FIG. 4 illustrates the water leakage detecting device according to a second embodiment of the present invention. Referring to FIG. 4, the water leakage detecting device includes a detector (numeral 90 of FIG. 1) detecting whether there is any leaked water retained in a base (numeral 100 of FIG. 1), a first signal converter 113 converting a voltage supplied from a power supply 115 to a first signal, when the detector 90 detects leaked water, a second signal converter 152 converting a voltage supplied from a power supply 115 to a second signal, when the detector 90 does not detect any leaked water, a connector 112 selectively connecting the power supply 115 to the first and second signal converters 113 and 152, and a controller 120 determining drainage of the leaked water based on the signal outputted from the first and second signal converters 113 and 152 and determining whether there is damage or malfunction in the water leakage detecting device.

The voltage of the first signal outputted from the first signal converter 113 is different from the voltage of the second signal outputted from the second signal converter 152, and the first signal and the second signal are supplied to the controller 120 through a single wire. Therefore, depending upon the voltage level of the received signal, the controller 120 can determine whether there is any leaked water retained in the base (numeral 100 of FIG. 1) and can determine whether the water leakage detecting device is damaged or has a malfunction.

The method for detecting water leakage according to the second embodiment of the present invention will now be described in detail.

When there is no leaked water detected in the base 100, the switch 500 does not connect the power supply 115 to a terminal 111 of the first signal converter 113, but only connects the power supply 115 to a terminal 151 of the second signal converter 152. Therefore, the second signal converter 152 outputs a signal having a predetermined level, for example, a signal of 3V. Conversely, if leaked water is detected in the base 100, the switch 500 connects the power supply 115 to the terminal 111 of the first signal converter 113. Therefore, the first signal converter 113 outputs a signal having a predetermined level, for example, a signal of 5V.

The controller 120 receives a signal from one of the first signal converter 113 and the second signal converter 152, and then the controller 120 determines whether the levels of the received signals are equal to the predetermined levels. If the received signal has a voltage level of 3V, the controller 120 simultaneously determines that there is no leaked water retained in the base 100 and that the water leakage detecting device is not damaged and has no malfunction. On the other hand, when the received signal has a voltage level of 5V, the controller 120 simultaneously determines that there is some leaked water retained in the base 100 and that the water leakage detecting device is not damaged and has no malfunction. Subsequently, the controller 120 stops the washing cycle currently in process and displays a message indicating water leakage while operating a drainage pump 70 so as to drain out the leaked water from the base 100.

As described above, when the water leakage detecting device is operated normally, the level of the signal outputted to the controller 120 should be equal to a predetermined voltage level, such as 3V or 5V. However, due to a malfunction or damage in the water leakage detecting device, the level of the signal outputted to the controller 120 may not be equal to the predetermined voltage level. When the voltage of the signal received from the controller 120 is not equal to the predetermined level, the controller 120 determines that the water leakage detecting device is damaged or has a malfunction, thereby displaying an "ERROR" message.

Third Embodiment

Figure 5:
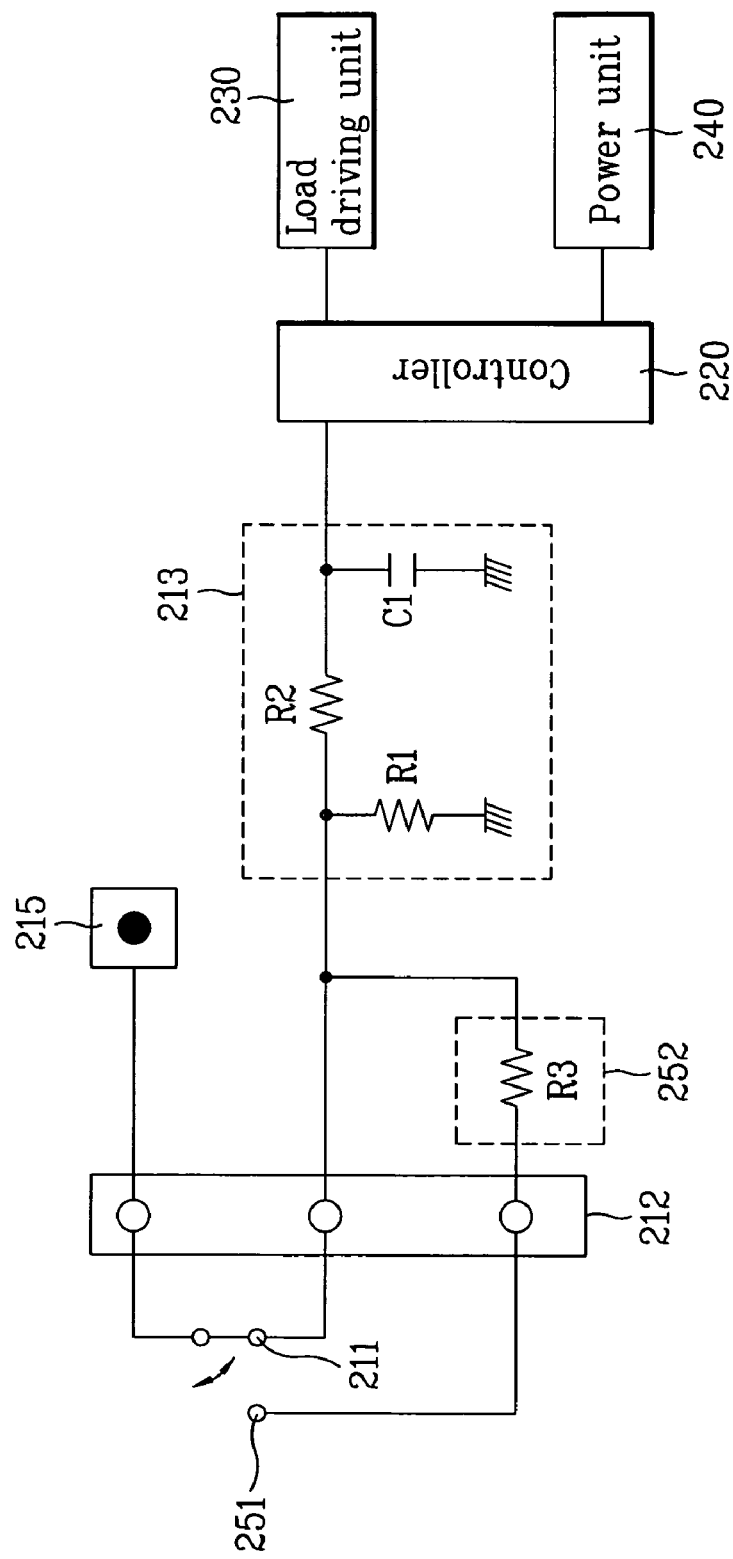
FIG. 5 illustrates the water leakage detecting device according to a third embodiment of the present invention.

FIG. 5 illustrates the water leakage detecting device according to a third embodiment of the present invention. Referring to FIG. 5, the water leakage detecting device includes a first signal converter 213 converting a voltage supplied from a power supply 215 to a signal having a constant level, when leaked water is detected, a second signal converter 252 converting a voltage supplied from a power supply 215 to a signal having a constant level, when leaked water is not detected, and outputting the converted signal through the first signal converter 213, a connector 212 selectively connecting the first and second signal converters 213 and 252 to the power supply 215, and a controller 220 determining drainage of the leaked water based on the signal outputted from the first and second signal converters 213 and 252 and determining whether there is a problem in the water leakage detecting device.

The method for detecting water leakage according to the third embodiment of the present invention will now be described in detail.

If leaked water is detected in the base 100, the switch 500 connects the power supply 215 to the terminal 211 of the first signal converter 213. Therefore, the first signal converter 213 outputs a signal having a predetermined level, for example, a signal of 5V. Conversely, when there is no leaked water detected in the base 100, the switch 500 does not connect the power supply 215 to a terminal 211 of the first signal converter 213, but only connects the power supply 215 to a terminal 251 of the second signal converter 252. Therefore, the second signal converter 252 outputs a signal having a predetermined level, for example, a signal of 4V. The level 4V signal outputted from the second signal converter 252 is inputted to the first signal converter 213 and converted to a level 3V signal. In other words, when leaked water is detected, the voltage supplied from the power supply 215 sequentially passes through the second signal converter 252 and the first signal converter 213.

The controller 220 receives a signal from the first signal converter 213, and then the controller 220 determines whether the levels of the received signals are equal to the predetermined levels. If the received signal has a voltage level of 3V, the controller 220 simultaneously determines that there is no leaked water in the base 100 and that the water leakage detecting device is not damaged and has no malfunction. On the other hand, when the received signal has a voltage level of 5V, the controller 220 simultaneously determines that there is some leaked water retained in the base 100 and that the water leakage detecting device is not damaged and has no malfunction. Subsequently, the controller 220 stops the washing cycle currently in process and displays a message indicating water leakage while operating a drainage pump 70 so as to drain out the leaked water from the base 100.

As described above, when the water leakage detecting device is operated normally, the level of the signal outputted to the controller 220 should be equal to a predetermined voltage level, such as 3V or 5V. However, due to a malfunction or damage in the water leakage detecting device, the level of the signal outputted to the controller 220 may not be equal to the predetermined voltage level. When the voltage of the signal received from the controller 220 is not equal to the predetermined level, the controller 220 determines that the water leakage detecting device is damaged or has a malfunction, thereby displaying an "ERROR" message.

Fourth Embodiment

Figure 6A:
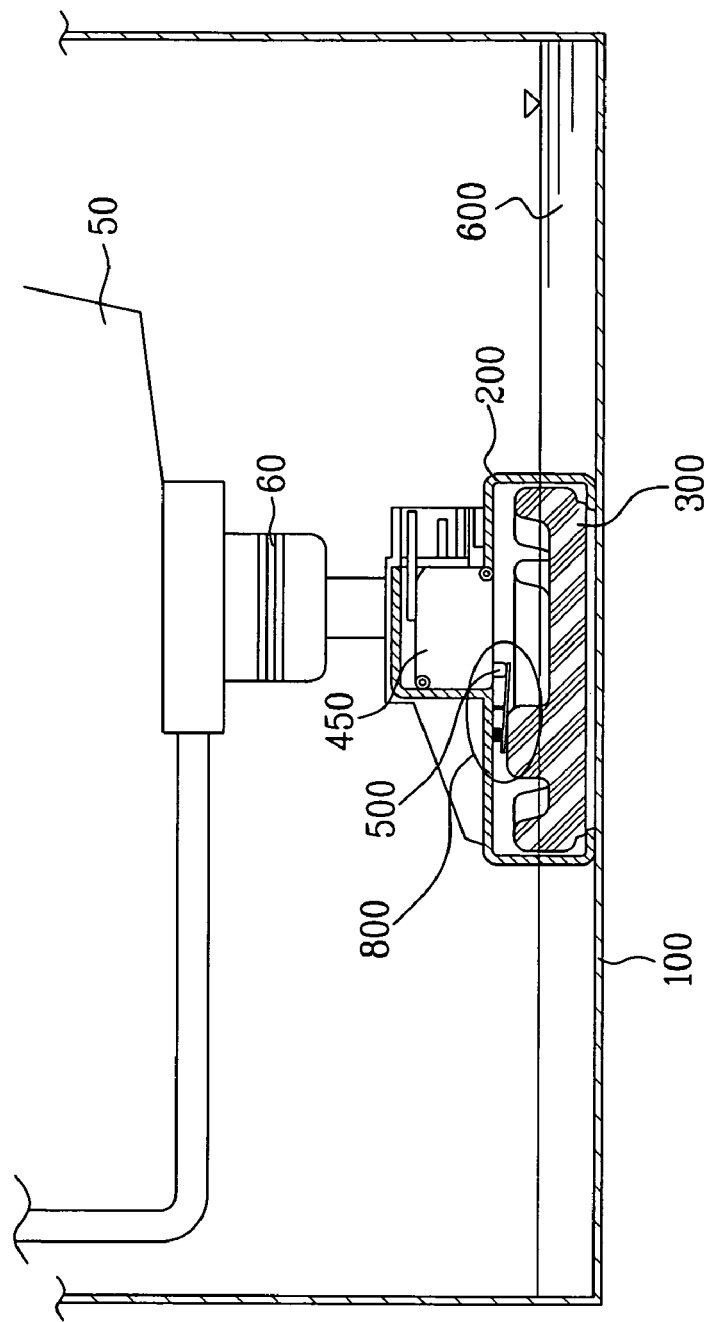
FIGS. 6A and 6B illustrate another type of the dishwasher according to the present invention.
Figure 6B:
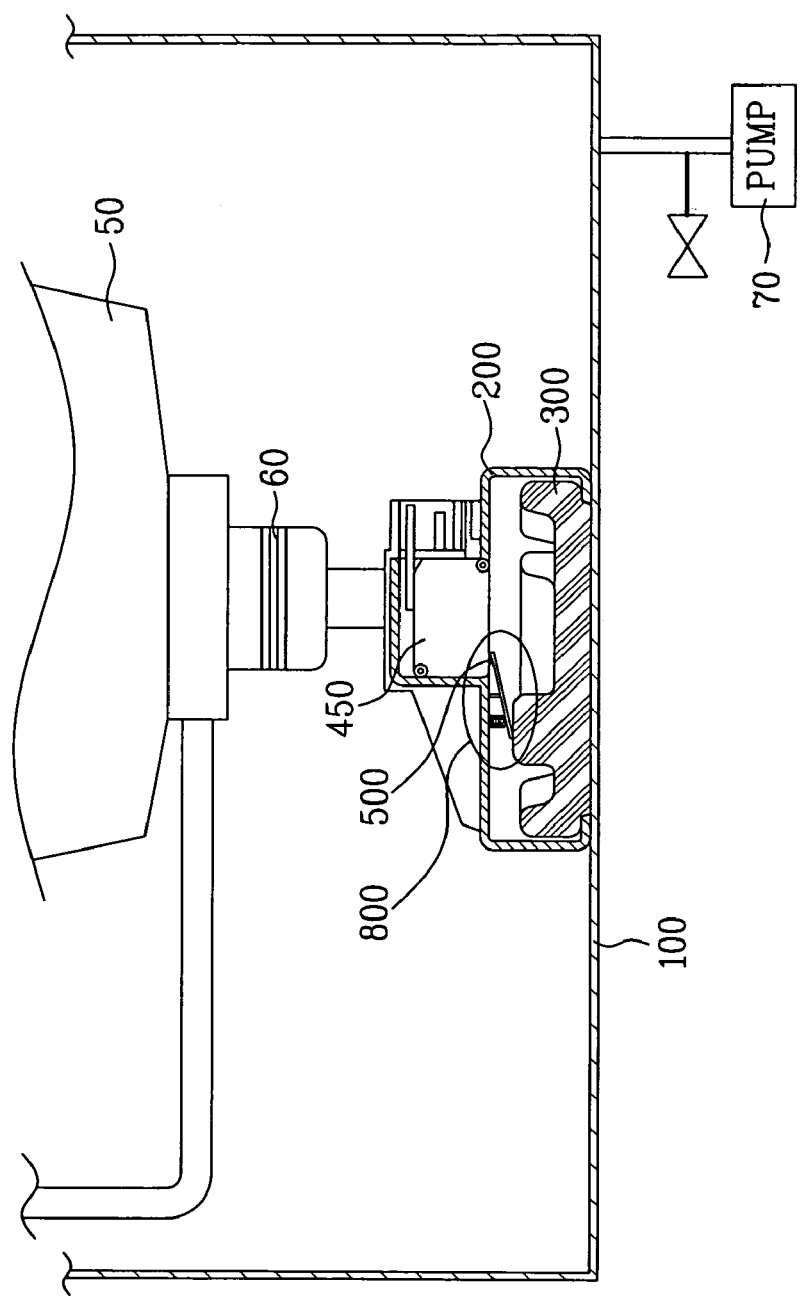
Figure 7:
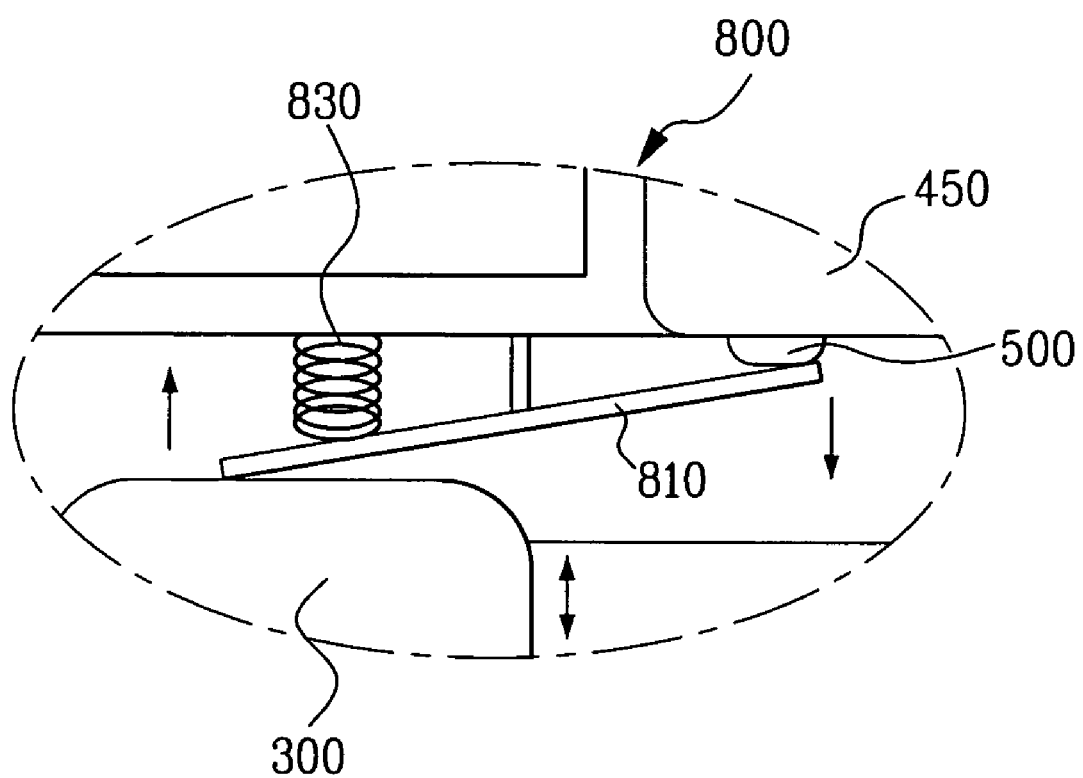
FIG. 7 illustrates a detailed view of a detector in FIGS. 6A and 6B.

FIGS. 6A, 6B, and 7 illustrate the water leakage detecting device according to a fourth embodiment of the present invention. A detector of the water leakage detecting device includes a stick 810 turning a switch 500 on or off depending upon the height of a floating unit 300, a support 820 supporting the stick 810 so as to allow the stick 810 to make seesaw movements, and a spring 830 for replacing the stock 810 moved by the floating unit 300 back to its initial position.

Figure 8:
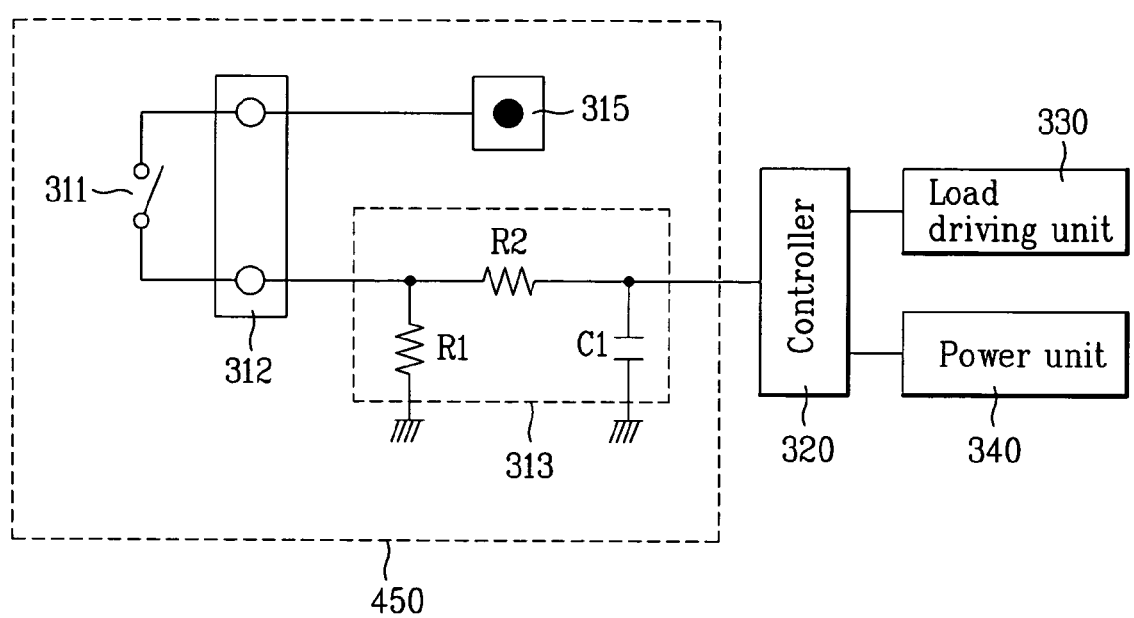
FIG. 8 illustrates the water leakage detecting device according to a fourth embodiment of the present invention.

FIG. 8 illustrates a signal output unit 450. Referring to FIG. 8, the signal output unit 450 includes a power supply 315, a connector 312, and a signal generator 313. The switch 500 is turned on, when leaked water is not detected. And, the switch 500 is turned off, when leaked water is detected in the base 100. Therefore, when leaked water is not detected, the signal output unit 450 outputs a high signal, and when leaked water is detected, the signal output unit 450 outputs a low signal. The signal generator 313 converts the voltage supplied from the power supply 315 to a signal having a predetermined level and outputs the converted signal to the controller 320.

The controller 320 receives the signal from the signal output unit 450 and determines the level of the received signal. If the level of the received signal is equal to the predetermined level, the controller 320 determines that there is no leaked water retained in the base 100. Conversely, if the level of the received signal is lower than the predetermined level, then the controller 320 determines that there is leaked water retained in the base 100. Furthermore, if the level of the received signal is higher than the predetermined level, then the controller 320 determines that the water leakage detecting device is damaged or has a malfunction.

Figure 9:
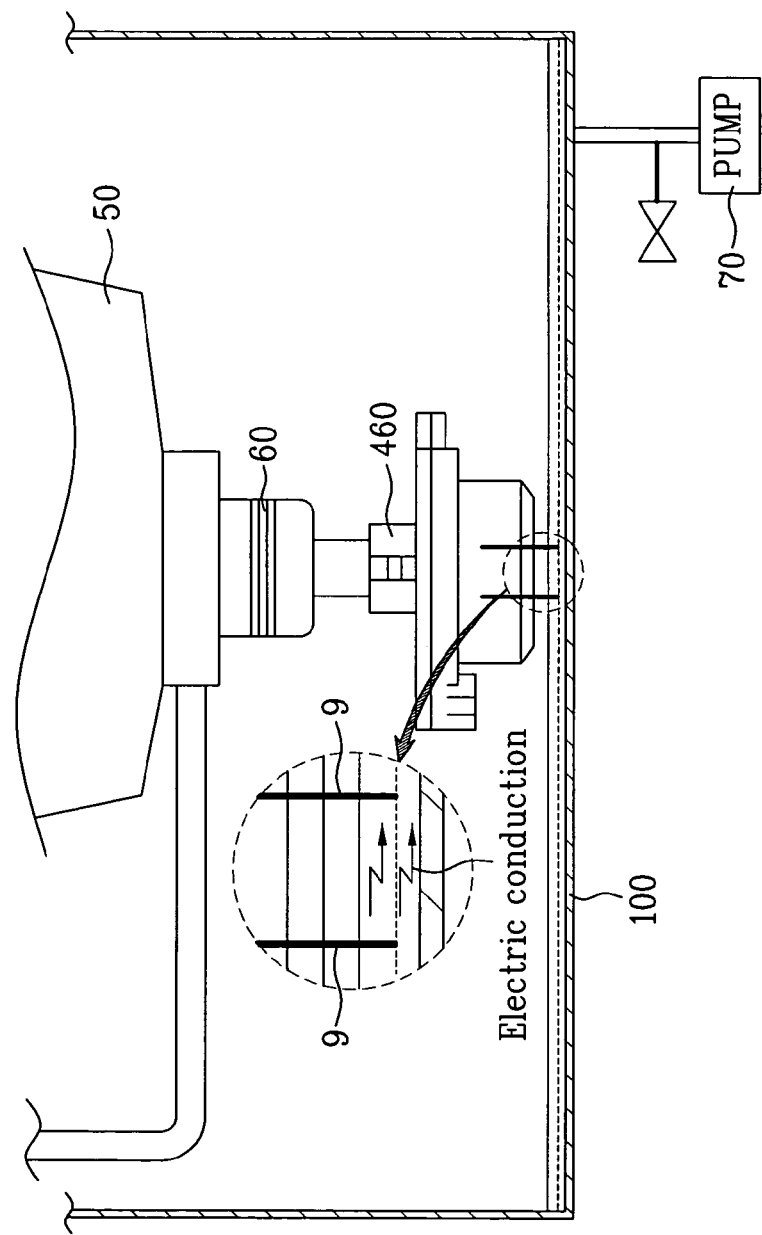
FIG. 9 illustrates another type of detector according to the present invention.

FIG. 9 illustrates another type of detector included in the water leakage detecting device according to the present invention. Referring to FIG. 9, the water leakage detecting device includes a pair of conductors 9, an electric current sensor 460 measuring an electric current between the conductors 9 and outputting a signal based on the measured electric current, and a controller determining whether there is leaked water retained in the base 100 in accordance with the signal outputted from the electric current sensor 460. The position of the conductors 9 is decided depending upon the allowed amount of leaked water (or level of water leakage).

Since water has a higher electrical conductivity than air, if leaked water is retained in the base 100, a large amount of electric current can flow between the pair of conductors 9. The controller can determine whether water is leaked based on the detected electric current.

As described above, the water leakage detecting device according to the present invention not only can accurately detect the leaked water retained in the base and drain the leaked water outside of the dishwasher at the appropriate time, but also can detect any damage or malfunctions within the device. Furthermore, the method for detecting water leakage according to the present invention can also be applied in other household appliances using water, such as washing machines.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A water leakage detecting device, comprising:
   a base retaining water leaked from a tub;
   a detector detecting whether leaked water is retained in the base;
   a first signal generator outputting a first signal, when the detector detects the leaked water;
   a second signal generator outputting a second signal, when the detector does not detect the leaked water; and
   a controller deciding whether to drain the leaked water and determining whether the water leakage detecting device has a malfunction based on the first and second signals.

2. The device according to claim 1, wherein the detector comprises,
   a floating unit changing its height in accordance with a level of the leaked water in the base, and
   a switch which selectively supplies a voltage to the first signal generator and the second signal generator depending upon the height of the floating unit.

3. The device according to claim 1, wherein the detector comprises,
   a pair of conductors spaced apart from each other and allowing electrical current to flow therebetween through the leaked water, and
   an electric current sensor sensing the electric current flowing between the pair of conductors.

4. The device according to claim 1, wherein the controller determines the water leakage detecting device to have a malfunction, when the controller either receives both signals from the first and second signal generators or neither of the signals from the first and second signal generators.

5. The device according to claim 1, wherein the leaked water is drained outside of the base, when the controller receives the first signal outputted from the first signal generator.

6. The device according to claim 1, wherein the controller resumes a washing cycle currently in process, when the controller only receives the second signal outputted from the second signal generator.

7. The device according to claim 1, wherein the controller compares voltage levels of the first and second signals received from the first and second signal generators through a single wire with reference voltage levels.

8. The device according to claim 7, wherein the controller determines the water leakage detecting device to have a malfunction, when the voltage levels of the first and second signals do not equal the reference voltage levels.

9. The device according to claim 7, wherein the controller decides whether to drain the leaked water from the base, when one of the voltage levels of the first and second signals is equal to the reference voltage level.

10. The device according to claim 1, wherein the second signal outputted from the second signal generator is provided through the first signal generator.

11. A method for detecting water leakage, comprising:
  detecting leaked water in a base;
  outputting a first signal, when the leaked water is detected, and outputting a second signal, when the leaked water is not detected; and
  deciding whether to drain the leaked water; and
  determining whether a water leakage detecting device has a malfunction, depending upon the first signal and the second signal.

12. The method according to claim 11, wherein when determining whether the water leakage detecting device has a malfunction, the water leakage detecting device is determined to have a malfunction, when both the first signal and the second signal are outputted and when neither of the first signal and the second signal is outputted.

13. The method according to claim 11, wherein when deciding whether to drain the leaked water, the leaked water is drained, when only the first signal is outputted.

14. The method according to claim 11, wherein when deciding whether to drain the leaked water, the leaked water is not drained and a washing cycle currently in process is resumed, when the second signal is outputted.

15. The method according to claim 11, wherein the deciding whether to drain the leaked water and determining whether the water leakage detecting device has a malfunction comprises comparing voltage levels of the signals outputted from a single wire with a reference voltage level, when the first signal and the second signal are outputted through a single wire.

16. The method according to claim 15, wherein the water leakage detecting device is determined to have a malfunction, when the levels of the signals outputted from the single wire are not equal to the reference voltage level.

17. The method according to claim 15, wherein the leaked water is decided to be drained depending upon the voltage level of the signals, when the level of any one of the signals outputted from the wire is equal to the reference voltage level.

* * * * *